United States Patent [19]
Brown

[11] 3,749,243
[45] July 31, 1973

[54] WASTE TREATMENT SYSTEM
[76] Inventor: James D. Brown, 1405 Marilyn Dr., Little Rock, Ark. 72205
[22] Filed: Apr. 30, 1971
[21] Appl. No.: 138,897

[52] U.S. Cl. ............................... 210/104, 210/525
[51] Int. Cl. ............................................ B01d 21/24
[58] Field of Search .................... 210/104, 259, 220, 210/221, 525

[56] References Cited
UNITED STATES PATENTS

| | | | |
|---|---|---|---|
| 2,138,349 | 11/1938 | Mallory | 210/220 X |
| 2,464,707 | 3/1949 | Montgomery et al. | 210/259 X |
| 2,876,863 | 3/1959 | Kivari | 210/525 X |
| 2,306,720 | 12/1942 | Fender | 210/259 X |
| 3,563,382 | 2/1971 | Regent | 210/104 |

Primary Examiner—John Adee
Attorney—Clarence A. O Brien and Harvey B. Jacobson

[57] ABSTRACT

Effluent is selectively received within a plurality of clarifiers, each of which incorporates upper and lower surface skimming and sludge removal rake apparatus. A sludge reservoir receives the raked solids for selective removal with the waste water moving from the clarifiers into an aeration chamber where it is subjected to an aeration procedure prior to discharge to a sewer line, stream or pond. The effluent, prior to introduction into the clarifiers, is injected with chemicals to expedite the removal of the solids and air to form particle attaching bubbles for a flotation thereof to the upper skimming area.

9 Claims, 5 Drawing Figures

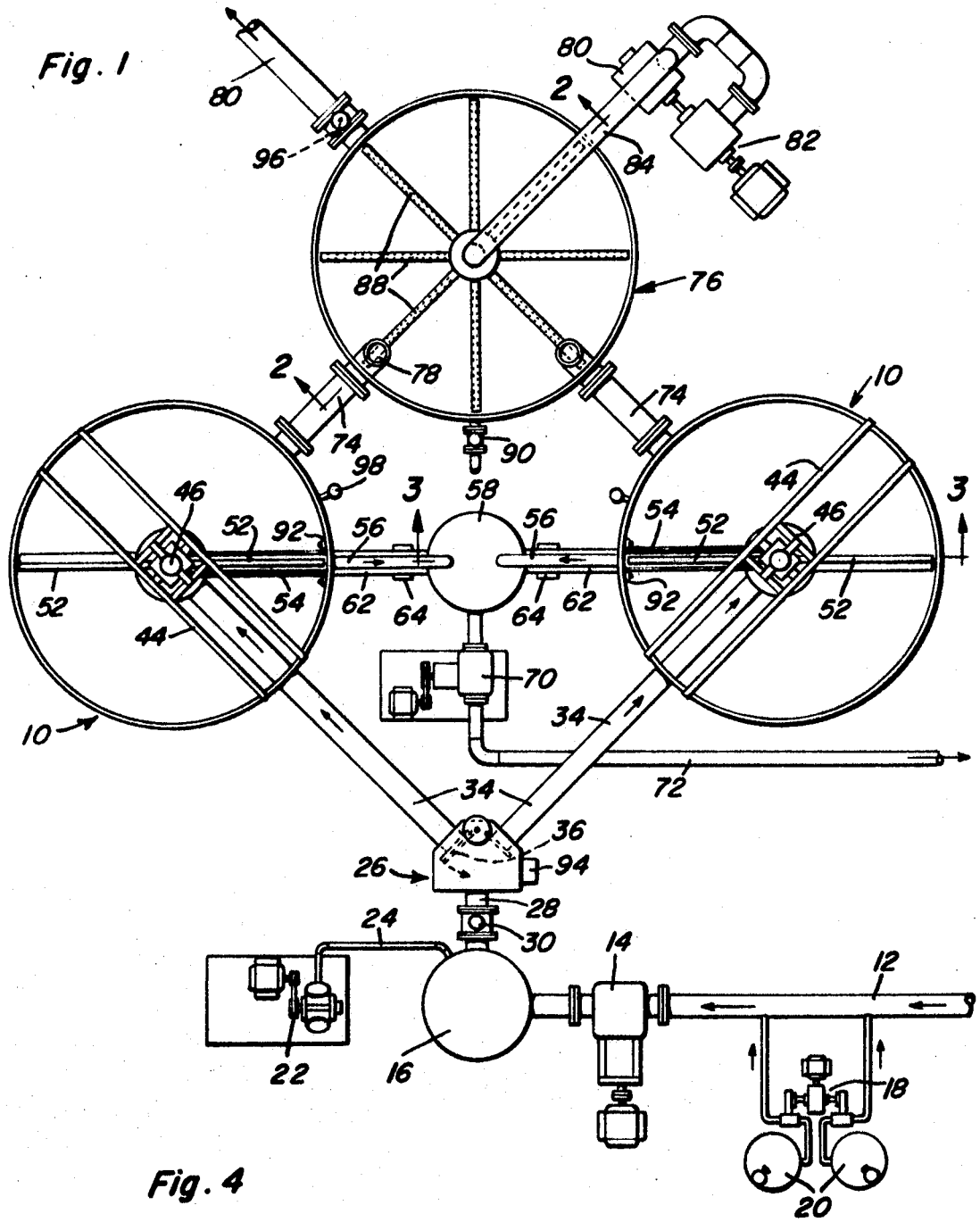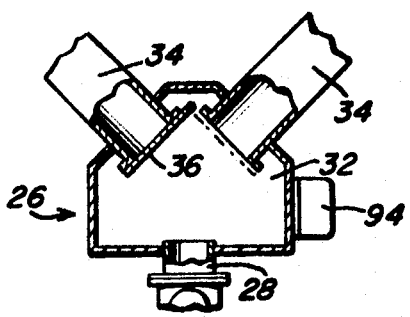

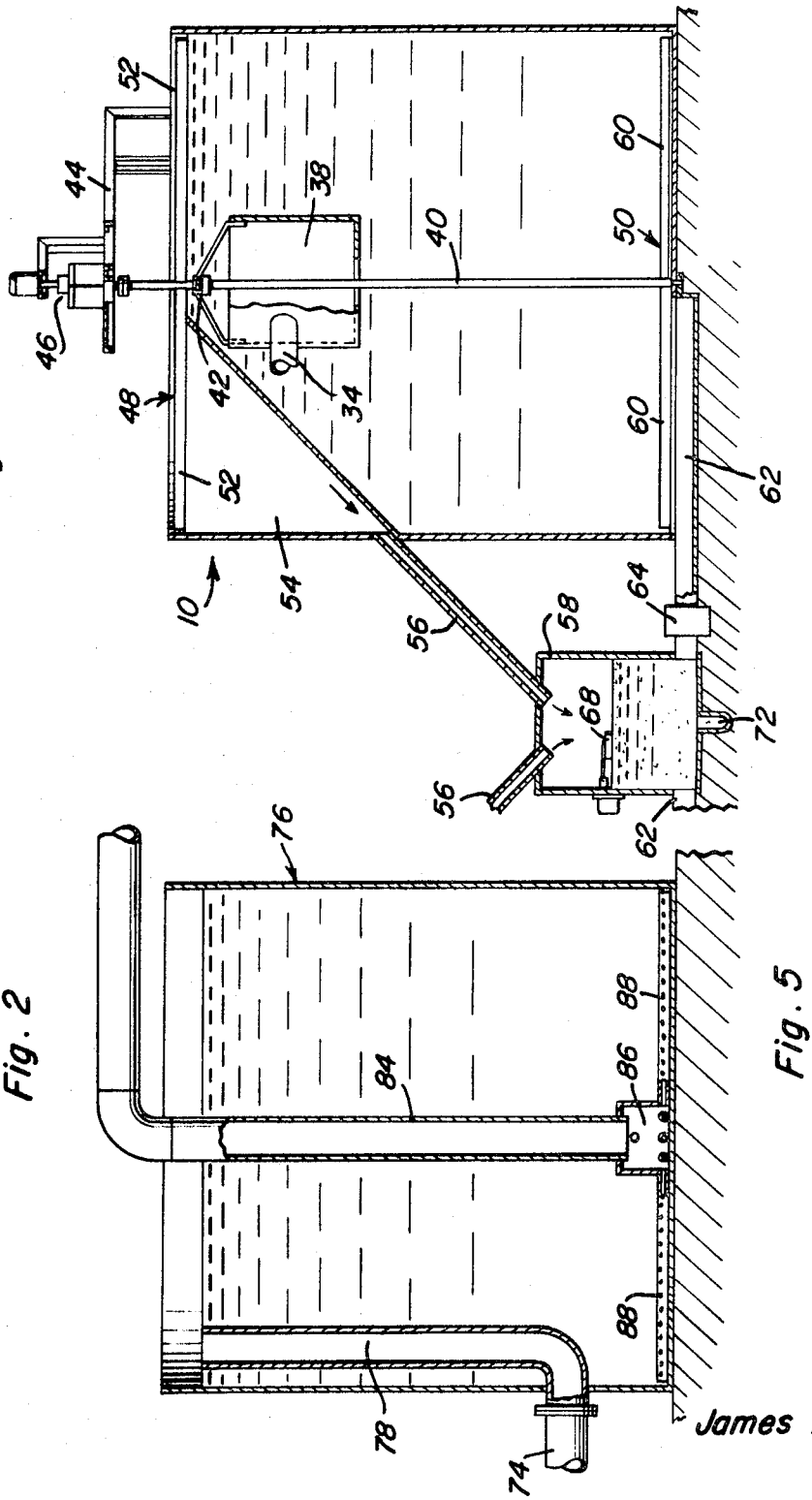

WASTE TREATMENT SYSTEM

The present invention relates to new and useful improvements in waste treatment systems of the type adapted to receive effluent from a typical plant for an effective clarification and purification thereof through a removal of the pollutants.

It is a primary object of the invention to provide a waste treatment system wherein apparatus is presented for providing a series of sequential operations on effluent or sewage in a manner contemplated to best achieve a clarification thereof through a removal or substantial reduction of the pollutants.

In conjunction with the above object, it is also a significant object of the instant invention to provide a unique combination of multiple clarifiers with common effluent preconditioning and feeding means and a common aeration chamber.

Further, it is an object of the instant invention to provide a system which incorporates automatic controls for regulating the flow through the system, maintaining constant levels and flow patterns throughout the operation thereof.

Basically, the objects of the invention are achieved through the provision of dual clarifiers selectively receiving an inflow of effluent, through the manipulation of a switch gate, from a pressure tank wherein the effluent is mixed with air. The effluent, prior to introduction into the pressure tank, is subjected to an introduction of such chemicals as deemed desirable to accelerate the clarification thereof within the clarifiers. The clarifiers incorporate upper and lower skimming and sludge removal raking apparatus which direct the solids to discharge flow lines directed to a central sludge reservoir. The remaining clarified waste liquid then moves through flow lines into a central aerator where it is subjected to pressure aeration prior to final discharge thereof to a sewer line, pond or the like.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

FIG. 1 is a generally schematic plan view of the system of the instant invention;

FIG. 2 is an enlarged cross-sectional detail through the aerator taken generally on a plane passing along line 2—2 in FIG. 1;

FIG. 3 is an enlarged cross-sectional detail through one clarifier and the associated sludge reservoir taken generally on a plane passing along line 3—3 in FIG. 1;

FIG. 4 is a cross-sectional detail through the switch gate assembly; and

FIG. 5 is a cross-sectional detail of the sludge rake illustrating the trough covering and trailing portion thereof.

Referring now more specifically to the drawings, attention is initially directed to the fact that two clarifiers 10 have been illustrated in conjunction with the system in that, while one or more clarifiers can in fact be used, it is believed that most applications will be best served by the use of two clarifiers as will be specifically hereinafter described.

The effluent or sewage is initially introduced into the system from a plant sump or the like through an intake line 12, appropriate pump means 14 being utilized to effect the flow of the effluent and the discharge thereof to a relatively small pressure tank 16. On the suction side of the pumping apparatus 14 provision is made for the introduction of chemicals by means of an appropriate control volume feeding apparatus 18 engaged between chemical supply tanks 20 and the inlet line 12. The chemicals are to be introduced into the effluent, effecting a preconditioning thereof, so as to expedite the removal of the pollutants. The particular types of chemicals used will of course be dependent upon the nature of the effluent being treated.

Air compressor apparatus 22 is communicated with the pressure tank 16 through air line 24 for a pressurized injection of air. The air is dispersed through the liquid effluent and partially disolved with the subsequent passage of the effluent to one or the other of the clarifiers 10 resulting in a release of the air in the form of tiny bubbles which attach themselves to the solid particles for a flotation thereof to the surface of the clarifier for removal as shall be described presently.

The pressure tank 16 is communicated with a switch gate assembly 26 through an appropriate flow line 28 having a back pressure regulator 30 therein. The switch gate assembly is in the nature of a sealed chamber 32 having, in addition to the discharge end of the flow line 28, a pair of outlet flow lines 34 communicated therewith, each extending to flow transferring communication with one of the clarifiers 10. In order to regulate the flow of the effluent first to one clarifier 10 and then the other, an appropriate switch gate or valve flap 36 is pivotally mounted between the inlet ends of the flow lines 34 for a selective movement between a first position sealing one line 34 and a second position sealing the second line 34, in each instance the opposite line being open for a reception of the effluent therethrough.

Inasmuch as the two clarifiers 10 are duplicates of each other, a detailed description of only one will suffice for purposes of illustration. The air charged effluent is introduced into the clarifier 10 through a centrally located elevated cylindrical feed box 38 with which the flow line 34 communicates. Incidentally, the clarifier 10 is in the nature of an enlarged cylindrical open top tank. The feed box 38 is mounted on the upper portion of a vertically elongated rake assembly shaft 40 through appropriate bearing collar means 42 whereby a rotation of the shaft 40 relative to fixed position box 38 is possible. The box 38 will normally be stabilized by the flow line 34 engaged therewith, this flow line in turn extending through and being appropriately sealed to the tank wall of the clarifier 10. The effluent in the feed box 34 discharges both through the open top and the open bottom thereof in a manner contemplated to reduce to a minimum any turbulence generated by the inflowing effluent.

An elevated tank spanning walkway and a rake support 44 extends diametrically across the clarifier 10 with the aforementioned central shaft 40 engaging appropriate powered drive means 46 mounted on the support 44. Affixed to the upper and lower portions of the shaft 40 are an upper skimming rake assembly 48 and a lower sludge raking assembly 50 respectively, orientated so as to skim the upper layer of floating solids and the lower sludge layer from the effluent within the clarifier 10 for discharge through appropriate discharge means.

The skimming rake assembly 48 normally comprises a pair of diametrically opposed raking blades 52 fixed to the shaft 40 for rotation therewith and extending radially outward therefrom to a point immediately adjacent the tank wall. These rake blades, which protrude sufficiently into the liquid effluent so as to penetrate the layer of floating solids for a movement of the solids ahead of the blade, selectively pass over a radially orientated skimming trough 54. The trough 54 projects radially inward from the wall of the clarifier 10 and includes a funneling interior which tapers downwardly for discharge into a solids discharge line 56. The line 56 in turn communicates directly with a centrally located sludge reservoir 58, the discharge line or lines 56 from the remaining clarifiers 10 also directly communicating with the single centrally located sludge reservoir 58.

The sludge rake assembly 50 also includes a pair of diametrically opposed radially extending blades 60 fixed to the shaft 40 for rotation therewith. These blades 60 sequentially pass over a sludge trough 62 communicated with and defined immediately below the bottom of the clarifier 10 for a raking and pushing of the bottom located sludge thereinto. The sludge trough in turn directly communicates, along with any similar sludge trough 62 from additional clarifiers 10, with the central sludge reservoir 58 for a discharge of the raked sludge thereto. The sludge trough 62 incorporates a switch controlled valve 64 therein which is opened only during those periods when a sludge rake blade 60 is passing over the sludge trough 62, thus providing for a maximum extraction of the raked sludge without a continual draining of the tank. Further, as suggested in FIG. 5, each blade 60 is to incorporate appropriate trailing means 66 which will effect a substantial covering or closing of the top of the tank portion of the trough 62 as the valve 64 is opened and the trough 62 draining into the sludge reservoir 58. The selective opening of the trough valve 64 will be effected by appropriate conventional limit switch means orientated in the path of movement of either the sludge raking blades 60 or the skimming blades 52 which are located in vertical alignment therewith. It will of course be appreciated that the valve 64 will remain open only for a period of time sufficient to clear the trough 62.

The sludge reservoir 58 will normally be equipped with a float control 68 for selectively activating a sludge discharge pump 70 upon the sludge within the reservoir 58 rising to a predetermined level. The sludge pump is incorporated in a sludge discharge flow line 72 which removes the sludge to appropriate screening apparatus for a mechanical separating of the solids from the liquid. The solids are delivered to a disposal truck or area, with the liquid discharging back to the effluent sump for a recycling through the system.

The now clarified fluid from the clarifier 10 moves through a lower flow line 74 into a centralized aerator 76 in the nature of an enlarged cylindrical open top tank. With reference to FIG. 2, it will be noted that the flow line 74 terminates, within the aerator tank, in a vertical standpipe portion 78 discharging the fluid toward the top of the tank for vertical movement thereof downwardly through the aerator 76 to the bottom located discharge line 80 illustrated in FIG. 1.

It is contemplated that the waste water within the aerator 76 be aerated at the rate of approximately 180 cubic feet of air per gallon of waste water. This volume of course can be adjusted as required. Aeration is preferably accomplished by means of a two stage positive displacement blower 80 having an appropriate power plant 82 associated therewith. The air flow line 84, communicated with the blower 80, enters centrally through the upper end of the tank and continues axially therethrough to a bottom located central cylindrical manifold 86. Eight equally spaced radial laterals 88 are communicated with the central manifold 86 and incorporates a series of air discharging small holes completely along the length thereof for a discharge of the blower driven air evenly and completely about the bottom of the aerator tank. The discharged air of course rises through the tank containing fluid and effects a complete aeration thereof prior to a discharge of the fluid through the discharge line 80. It will of course be appreciated that both clarifiers 10 discharge into the single aerator or aeration chamber 76. With reference to FIG. 1, 90 designates a clean-out drain provided on the aerator tank. Similar clean-out drains will of course be provided on the clarifiers 10.

As will be readily appreciated, the system is to incorporate automatic controls which include a limit switch 92 mounted on the lip of the skimmer trough 54 associated with each clarifier. The switch 92 associated with each clarifier 10 senses the attainment of a specific effluent level within the clarifier tank and is automatically activated to rotate the switch gate or flap valve 36 within the switch gate assembly 26 to divert inflowing effluent to the second clarifier. Once both clarifiers 10 have been filled to the optimum level, the movement of the switch gate 36 is operated on a timed basis under the control of a timer 94 whereby each flow line 34 is sequentially opened for a predetermined cycle period generally permitting a flow equal to the capacity of the clarifier, providing in effect, at each cycle, a complete changing of the contents within the clarifier. It will be appreciated that the height of the standpipe 78 within the aeration tank 76 will generally determine the maximum level within the clarifier 10 in that the introduction of effluent within the clarifier 10 to bring the level thereof above the level of the top of the aerator standpipe 78 will result in a flow of the liquid from the clarifier into the aerator. Thus, as each clarifier is cyclicly communicated with the incoming sewage, the level therein will rise above the top of the standpipe height 78 and result in a flow through the line 74 into the aerator 76, the cycle, as previously indicated, being of sufficient duration so as to in effect completely replace the effluent within the clarifier 10.

In order to maintain a proper level within the aerator, the discharge line 80 thereof incorporates an appropriate butterfly valve 96 which is directly controlled by appropriate level sensors 98 on the clarifiers 10. The sensors 98 operate in a manner whereby when the level within a particular clarifier 10 rises to the point at which discharge into the aerator 76 is effected, the butterfly valve 96 opens the discharge line 80 to provide for a corresponding discharge from the aerator 76. In this manner, the level within the aerator tank 76 is maintained with the liquid being retained therein sufficiently so as to achieve the desired aeration thereof. It will of course be appreciated that the valve 96 and control apparatus therefor will not be activated until an initial filling of the aerator tank to a predetermined level at the start of the treatment operation.

From the foregoing, it will be appreciated that a highly unique system has been devised which is contemplated to rapidly and effectively clarify and purify effluent. Multiple operations are performed on the effluent in sequence and in a manner whereby a minimum amount of equipment is required for the handling of a substantial volume. In particular, the system provides for the utilization of multiple clarifiers in conjunction with a single effluent feed system and a single aeration chamber and associated discharge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An effluent treatment system comprising at least one clarifier, means for introducing effluent into said clarifier, said clarifier incorporating surface skimming apparatus for removal of floating solids and bottom sludge removing apparatus, a sludge reservoir, flow lines communicating said surface skimming apparatus and said sludge removing apparatus with said reservoir, an aerator, means communicating said clarifier with said aerator for the introduction of clarified effluent thereto, a discharge line extending from said aerator, means for preconditioning the effluent prior to introduction thereof into the clarifier, such preconditioning means comprising chemical feeding apparatus, a pressure tank downstream of said chemical feeding apparatus, and air injection means communicating with said pressure tank for a charging of the effluent within the tank for the production of particle buoying bubbles upon introduction into the clarifier, and flow line means communicating said pressure tank with said clarifier, valve means in the flow line communicating the sludge removing apparatus and the reservoir for a selective opening and closing of this line in response to operation of the sludge removing apparatus, second valve means in the flow line means communicating the pressure tank with the clarifier, and level sensing means within said clarifier operatively opening and closing the second valve means to regulate the flow into the clarifier in response to the level within the clarifier, said sludge removing apparatus comprising a trough within the bottom of the clarifier, rake means selectively movable about the bottom of the clarifier and over said trough, said rake means substantially completely covering said trough, the valve means within the flow line between the sludge removing apparatus and the reservoir opening coincident with the covering of the trough by the rake means.

2. The system of claim 1 wherein said surface skimming apparatus comprises a trough mounted within the clarifier at a level corresponding to the level of the effluent within the clarifier, and rake means operationally driven for movement about the surface of the effluent within the clarifier for movement of floating particles therein to and into the associated trough.

3. The system of claim 6 wherein said aerator comprises a vertical tank, a source of pressurized air, an air line running from said source to the bottom of said aerator tank, and a manifold-type air discharge positioned throughout the bottom of the tank for the reception and subsequent discharge of the air through the tank.

4. The system of claim 3 wherein the discharge line extending from the aerator includes an off-on valve therein, and level sensing means associated with the clarifier and operatively controlling said discharge line valve for an opening and closing thereof in response to predetermined effluent levels in the clarifier.

5. The system of claim 4 including a second clarifier duplicating said first clarifier and communicated with said means for introducing the effluent, said sludge reservoir, and said aerator.

6. The system of claim 5 wherein said means for introducing effluent into the clarifier includes means for selectively directing the effluent first to one clarifier and then to the second clarifier.

7. The system of claim 1 including a sludge discharge line and sludge pump associated with said sludge reservoir and a sludge level responsive means within said sludge reservoir for effecting an automatic activation of said sludge pump for a pumping of sludge from said reservoir.

8. An effluent treatment system comprising a clarifier, means for introducing effluent into said clarifier, said clarifier incorporating surface skimming apparatus for removal of floating solids and bottom sludge removing apparatus, a sludge reservoir, flow lines communicating said surface skimming apparatus and said sludge removing apparatus with said reservoir, and valve means in the flow line communicating the sludge removing apparatus and the reservoir for a selective opening and closing of this line in response to operation of the sludge removing apparatus, said sludge removing apparatus comprising a trough within the bottom of the clarifier, rake means selectively movable about the bottom of the clarifier and over said trough, said rake means substantially completely covering said trough, the valve means within the flow line between the sludge removing apparatus and the reservoir opening coincident with the covering of the trough by the rake means.

9. The system of claim 8 including an aerator, means communicating said clarifier with said aerator for the introduction of clarified effluent thereto, a discharge line extending from said aerator, said discharge line including an off-on valve therein, and leveling sensing means associated with the clarifier and operatively controlling the discharge line valve for an opening and closing thereof in response to predetermined effluent levels in the clarifier.

* * * * *